J. CARLTON.
Churn.
No. 84,858.
Patented Dec. 15, 1868.
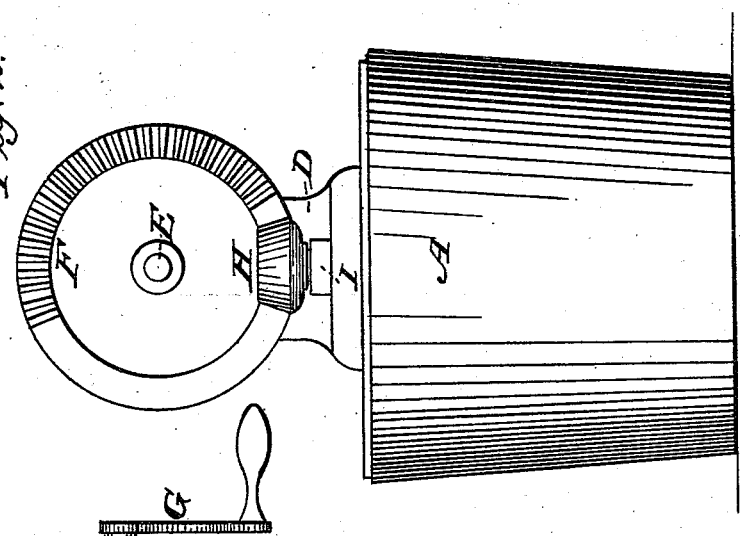
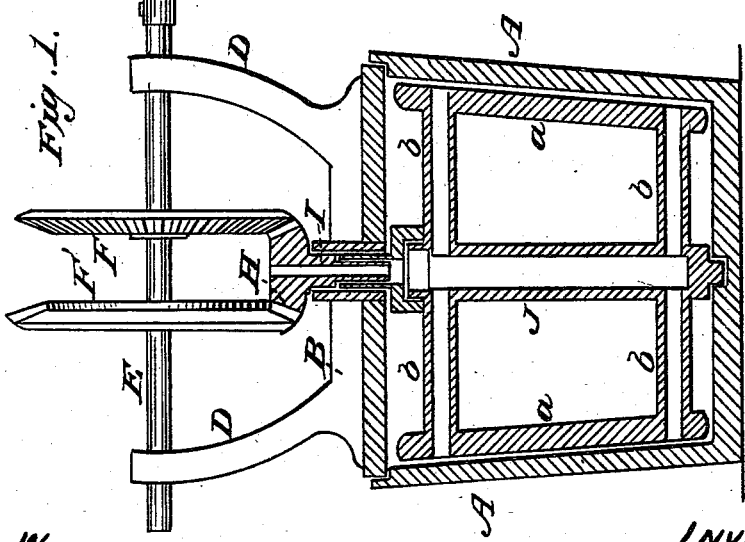
WITNESSES:
INVENTOR:

JAMES CARLTON, OF WALLA WALLA, WASHINGTON TERRITORY.

Letters Patent No. 84,858, dated December 15, 1868.

IMPROVEMENT IN CHURNS.

The Schedule referred to in these Letters Patent and making part of the same.

*To all whom it may concern:*

Be it known that I, JAMES CARLTON, of Walla Walla, county of Walla Walla, Washington Territory, have invented an Improved Reaction-Churn; and I do hereby declare the following description and accompanying drawings are sufficient to enable any person skilled in the art or science to which it most nearly appertains, to make and use my said invention or improvements without further invention or experiment.

The object of my invention is to provide an improved device for the purpose of converting cream into butter, which I term "a reaction-churn;" and It consists in so arranging the driving-gear that the agitators will be moved once around and back alternately, producing a reaction, which will quickly convert the cream into butter.

On the top of the cover are two projecting standards, opposite each other.

A shaft, which is operated by a crank at one end, passes across these standards, having its bearings on their tops.

This shaft carries, near its centre, two partially-cogged wheels, which gear, alternately, with a pinion placed between them, which gives an alternate rotary motion to the agitators in the churn.

The shaft which carries the agitators is connected to the pinion-shaft by a square coupling, so that it may be taken off, when desired.

Air is admitted to the interior of the churn through the pinion-shaft, agitator-shaft, and arms, which are hollow.

To more fully explain my invention, reference is had to the accompanying drawings, and letters marked thereon, forming a part of this specification, of which—

Figure 1 is a side sectional view of my invention.

Figure 2 is a side view, showing one of the wheels.

A is a churn, of the ordinary construction, which is provided with a cover, B.

Two upright standards, D D, are placed at each side of the cover, opposite each other.

A shaft, E, carrying two partially-cogged bevel-wheels, F F, has its bearings on the top of the arms D D, and is driven by a crank, G.

A pinion, H, turning on an upright shaft, I, which passes down through the cover, is placed between the wheels F F, which, being provided with cogs only on one side, engage the pinion alternately, moving it in one direction entirely around, and then in the other, without reversing the direction of the driving-shaft.

The agitators consist of two wings or floats, $a\ a$, attached to a spindle, J, by means of arms $b\ b$.

The spindle J has its step in the bottom of the churn, the upper end being attached to the pinion-shaft I by means of a square coupling at $c$.

The pinion-shaft I, spindle J, and arms $b\ b$ are hollow, in order to admit the air into the milk during the process of churning.

By the use of this device, a churning can be done in a very short time, with very little labor, the peculiar motion of the agitators tending to keep the cream in a constant state of ebullition.

Having thus described my invention,

What I claim, and desire to secure by Letters Patent, is—

In combination with the partially-cogged gear-wheels F F and hollow pinion H, the agitator, composed of the hollow spindle J, hollow arms $b\ b$, and floats $a\ a$, substantially as and for the purpose herein described.

In witness whereof, I have hereunto set my hand and seal.

JAMES CARLTON. [L. S.]

Witnesses:
J. L. BOONE,
GEO. H. STRONG.